United States Patent
Duesterwald et al.

(10) Patent No.: US 6,785,801 B2
(45) Date of Patent: Aug. 31, 2004

(54) SECONDARY TRACE BUILD FROM A CACHE OF TRANSLATIONS IN A CACHING DYNAMIC TRANSLATOR

(75) Inventors: Evelyn Duesterwald, Somerville, MA (US); Vasanth Bala, Sudbury, MA (US); Sanjeev Banerjia, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

(21) Appl. No.: 09/755,382

(22) Filed: Jan. 5, 2001

(65) Prior Publication Data

US 2001/0042172 A1 Nov. 15, 2001

Related U.S. Application Data

(60) Provisional application No. 60/184,624, filed on Feb. 9, 2000.

(51) Int. Cl.$^7$ ............................................... G06F 13/00
(52) U.S. Cl. ...................................... 712/209; 712/227
(58) Field of Search ................................. 712/209, 227, 712/233, 238, 208, 210, 211; 711/118, 125, 100

(56) References Cited

U.S. PATENT DOCUMENTS

| | | | | |
|---|---|---|---|---|
| 5,815,720 A | * | 9/1998 | Buzbee | 717/158 |
| 5,909,578 A | * | 6/1999 | Buzbee | 717/130 |
| 5,933,622 A | * | 8/1999 | Buzbee et al. | 703/22 |
| 6,237,065 B1 | * | 5/2001 | Banerjia et al. | 711/133 |
| 6,425,069 B1 | * | 7/2002 | Thatcher et al. | 712/24 |
| 6,453,411 B1 | * | 9/2002 | Hsu et al. | 712/237 |
| 6,631,514 B1 | * | 10/2003 | Le | 717/137 |

OTHER PUBLICATIONS

Bob Cmelik, et al.: "Shade: A Fast Instruction–Set Stimulator for Execution Profiling"; SIGMETRICS 94–5/94; pp 128–137.

Thomas Ball, et al.; "Branch Prediction for Free"; ACM–SIGPLAN–PLDI–6/93; pp 300–313.

Thomas Ball, et al.; "Efficient Path Profiling"; 1072–4451/96 IEEE; pp 46–57.

* cited by examiner

Primary Examiner—Henry W. H. Tsai

(57) ABSTRACT

A method for growing a secondary trace out of a cache of translations for a program during the program's execution in a dynamic translator, comprising the steps of: maintaining execution counts for translation heads that are executed from a code cache; when an execution count for one of said translation heads exceeds a threshold, designated as a hot translation head, beginning a mode of operation in which, as following code translations are executed from the code cache after the execution of the hot translation head, storing in a history buffer information identifying each of the following code translations in sequence; terminating the storing of information in the history buffer in relation to the hot translation head when a termination condition is met; and linking together the translation head and the sequence of following code translations identified in the history buffer to form a larger code translation.

10 Claims, 3 Drawing Sheets

SECONDARY TRACE BUILD FROM A CACHE OF TRANSLATIONS IN A CACHING DYNAMIC TRANSLATOR

RELATED APPLICATION

This application claims priority to provisional U.S. application serial No. 60/184,624, filed on Feb. 9, 2000, the content of which is incorporated herein in its entirety.

FIELD OF INVENTION

The present invention relates to techniques for identifying portions of computer programs that are frequently executed. The present invention is particularly useful in dynamic translators needing to identify candidate portions of code for caching and/or optimization.

BACKGROUND OF THE INVENTION

Dynamic emulation is the core execution mode in many software systems including simulators, dynamic translators, tracing tools and language interpreters. The capability of emulating rapidly and efficiently is critical for these software systems to be effective. Dynamic caching emulators (also called dynamic translators) translate one sequence of instructions into another sequence of instructions which is executed. The second sequence of instructions are 'native' instructions—they can be executed directly by the machine on which the translator is running (this 'machine' may be hardware or may be defined by software that is running on yet another machine with its own architecture). A dynamic translator can be designed to execute instructions for one machine architecture (i.e., one instruction set) on a machine of a different architecture (i.e., with a different instruction set). Alternatively, a dynamic translator can take instructions that are native to the machine on which the dynamic translator is running and operate on that instruction stream to produce an optimized instruction stream. Also, a dynamic translator can include both of these functions (translation from one architecture to another, and optimization).

A traditional emulator interprets one instruction at a time, which usually results in excessive overhead, making emulation practically infeasible for large programs. A common approach to reduce the excessive overhead of one-instruction-at-a-time emulators is to generate and cache translations for a consecutive sequence of instructions such as an entire basic block. A basic block is a sequence of instructions that starts with the target of a branch and extends up to the next branch.

Caching dynamic translators attempt to identify program hot spots (frequently executed portions of the program, such as certain loops) at runtime and use a code cache to store translations of those frequently executed portions. Subsequent execution of those portions can use the cached translations, thereby reducing the overhead of executing those portions of the program.

Accordingly, instead of emulating an individual instruction at some address x, an entire basic block is fetched starting from x, and a code sequence corresponding to the emulation of this entire block is generated and placed in a translation cache. See Bob Cmelik, David Keppel, "Shade: A fast instruction-set simulator for execution profiling," Proceedings of the 1994 ACM SIGMETRICS Conference on Measurement and Modeling of Computer Systems. An address map is maintained to map original code addresses to the corresponding translation block addresses in the translation cache. The basic emulation loop is modified such that prior to emulating an instruction at address x, an address look-up determines whether a translation exists for the address. If so, control is directed to the corresponding block in the cache. The execution of a block in the cache terminates with an appropriate update of the emulator's program counter and a branch is executed to return control back to the emulator.

As noted above, a dynamic translator may take instructions in one instruction set and produce instructions in a different instruction set. Or, a dynamic translator may perform optimization: producing instructions in the same instruction set as the original instruction stream. Thus, dynamic optimization is a special native-to-native case of dynamic translation. Or, a dynamic translator may do both—converting between instruction sets as well as performing optimization.

In general, the more sophisticated the hot spot detection scheme, the more precise the hot spot identification can be, and hence (i) the smaller the translated code cache space required to hold the more compact set of identified hot spots of the working set of the running program, and (ii) the less time spent translating hot spots into native code (or into optimized native code). The usual approach to hot spot detection uses an execution profiling scheme. Unless special hardware support for profiling is provided, it is generally the case that a more complex profiling scheme will incur a greater overhead. Thus, dynamic translators typically have to strike a balance between minimizing overhead on the one hand and selecting hot spots very carefully on the other.

Depending on the profiling technique used, the granularity of the selected hot spots can vary. For example, a fine-grained technique may identify single blocks (a straight-line sequence of code without any intervening branches), whereas a more coarse approach to profiling may identify entire procedures. A procedure is a self-contained piece of code that is accessed by a call/branch instruction and typically ends with an indirect branch called a return. Since there are typically many more blocks that are executed compared to procedures, the latter requires much less profiling overhead (both memory space for the execution frequency counters and the time spent updating those counters) than the former. In systems that are performing program optimization, another factor to consider is the likelihood of useful optimization and/or the degree of optimization opportunity that is available in the selected hot spot. A block presents a much smaller optimization scope than a procedure (and thus fewer types of optimization techniques can be applied), although a block is easier to optimize because it lacks any control flow (branches and joins).

Traces offer yet a different set of tradeoffs. Traces (also known as paths) are single-entry multi-exit dynamic sequences of blocks. Although traces often have an optimization scope between that for blocks and that for procedures, traces may pass through several procedure bodies, and may even contain entire procedure bodies. Traces offer a fairly large optimization scope while still having simple control flow, which makes optimizing them much easier than a procedure. Simple control flow also allows a fast optimizer implementation. A dynamic trace can even go past several procedure calls and returns, including dynamically linked libraries (DLLs). This ability allows an optimizer to perform inlining, which is an optimization that removes redundant call and return branches, which can improve performance substantially.

Unfortunately, without hardware support, the overhead required to profile hot traces using existing methods (such as described by T. Ball and J. Larus in "Efficient Path Profiling", Proceedings of the 29th Symposium on Micro Architecture (MICRO-29), December 1996) is often prohibitively high. Such methods require instrumenting the program binary (invasively inserting instructions to support profiling), which makes the profiling non-transparent and can result in binary code bloat. Also, execution of the inserted instrumentation instructions slows down overall program execution and once the instrumentation has been inserted, it is difficult to remove at runtime. In addition, such a method requires sufficiently complex analysis of the counter values to uncover the hot paths in the program that such method is difficult to use effectively on-the-fly while the program is executing. All of these factors make traditional schemes inefficient for use in a caching dynamic translator.

Hot traces can also be constructed indirectly, using branch or basic block profiling (as contrasted with trace profiling, where the profile directly provides trace information). In this scheme, a counter is associated with the Taken target of every branch (there are other variations on this, but the overheads are similar). When the caching dynamic translator is interpreting the program code, it increments such a counter each time a Taken branch is interpreted. When a counter exceeds a preset threshold, its corresponding block is flagged as hot. These hot blocks can be strung together to create a hot trace. Such a profiling technique has the following shortcomings:

1. A large counter table is required, since the number of distinct blocks executed by a program can be very large.
2. The overhead for trace selection is high. The reason can be intuitively explained: if a trace consists of N blocks, this scheme will have to wait until N counters all exceed their thresholds before they can be strung into a trace.

Note also that to avoid unnecessary context—switches upon exiting from the translation cache, the translations that reside inside the cache are directly interconnected whenever possible. Thus, if a basic block translation terminates with a branch that targets another translation in the cache, the branch is patched to directly jump to the other translation.

SUMMARY OF THE INVENTION

Briefly, the present invention comprises, in one embodiment, a method for growing a secondary trace out of a cache of translations for a program during the program's execution in a dynamic translator, comprising the steps of: maintaining execution counts for translation heads that are executed from a code cache; when an execution count for one of said translation heads exceeds a threshold, designated as a hot translation head, beginning a mode of operation in which, as following code translations are executed from the code cache after the execution of the hot translation head, storing in a history buffer information identifying each of said following code translations in sequence; terminating the storing of information in the history buffer in relation to the hot translation head when a termination condition is met; and linking together the translation head and the sequence of following code translations identified in the history buffer to form a larger code translation.

In a further aspect, the present invention comprises the step of identifying code translations that are translation heads and disabling certain branches that connect the translation head to successor translations.

In yet a further aspect of the present invention, the certain branches that are disabled are direct connections to translation heads that are not second level code translations, where the direct connections are those that originate from either a backwards taken branch of a different code translation or from a second-level code translation.

In a yet further aspect of the present invention, the translation heads are identified as either a target of a backwards taken branch from another code translation or a target of a branch that exits from a second-level translation.

In a yet further aspect of the present invention, the information stored in the history buffer about a code translation is a pointer to the code translation and a pointer to the branch that exited from that code translation.

In yet another aspect, the present invention further comprises the step of, when in the mode of operation in which information is stored in the history buffer, prior to execution of each following code translation after the translation head, disabling the outgoing branches from the following code translation to successor code translations in the code cache, thereby assuring that the mechanism for storing information in the history buffer regains control prior to executing each subsequent code translation.

In yet another aspect of the present invention, the mode of operation in which information is stored in the history buffer includes the steps of (1) storing a pointer to the most recently executed following code translation and a pointer to its exiting branch, (2) re-enabling the disabled branch from the most recently executed following code translation to its successor code translation in the cache, (3) disabling the branch to the next-to-execute following code translation, and (4) jumping to the next-to-execute following code translation.

In yet a further aspect of the present invention, the termination condition is met when either (1) the next following code translation to be executed is identical to the first code translation identified in the history buffer, or (2) the history buffer is full, or (3) the next following code translation is a secondary code translation.

In a further embodiment of the present invention, a dynamic translator is provided for growing a secondary trace out of cache translations for a program during the program's execution in a dynamic translator, comprising: first logic maintaining execution counts for translation heads that are executed from a code cache; second logic for, when an execution count for one of said translation heads exceeds a threshold, designated as a hot translation head, beginning a mode of operation in which, as following code translations are executed from the code cache after the execution of the hot translation head, storing in a history buffer information identifying each of said following code translations in sequence; third logic for terminating the storing of information in the history buffer in relation to the hot translation head when a termination condition is met; and fourth logic for linking together the translation head and the sequence of following code translations identified in the history buffer to form a larger code translation.

In yet a further embodiment of the present invention, a computer program product is provided, comprising: a computer usable medium having computer readable program code embodied therein for growing a secondary trace out of cache translations for a program during the program's execution in a dynamic translator comprising first code for maintaining execution counts for translation heads that are executed from a code cache; second code for, when an execution count for one of said translation heads exceeds a threshold, designated as a hot translation head, beginning a mode of operation in which, as following code translations are executed from the code cache following the execution of the hot translation head, storing in a history buffer information identifying each of said following code translations in sequence; third code for terminating the storing of information in the history buffer in relation to the hot translation head when a termination condition is met; and fourth code for linking together the translation head and the sequence of following code translations identified in the history buffer to form a larger code translation.

BRIEF DESCRIPTION OF THE DRAWINGS

The invention is pointed out with particularity in the appended claims. The above and other advantages of the invention may be better understood by referring to the following detailed description in conjunction with the drawing, in which:

DETAILED DESCRIPTION OF THE PREFERRED EMBODIMENT

Figure 1:
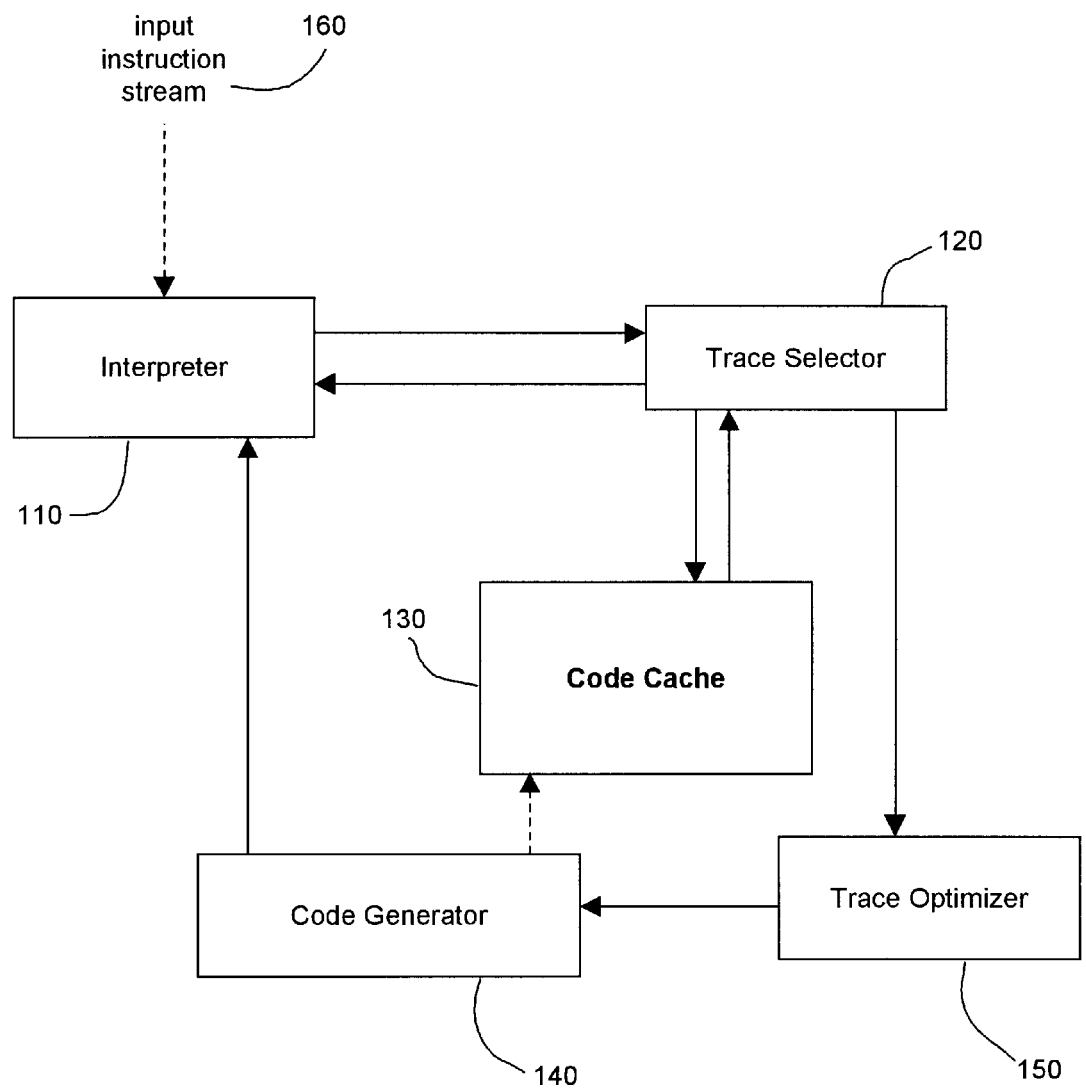
FIG. 1 is a block diagram illustrating the components of a dynamic translator such as one in which the present invention can be employed.

Referring to FIG. 1, a dynamic translator is shown that includes an interpreter 110 that receives an input instruction stream 160. This "interpreter" represents the instruction evaluation engine; it can be implemented in a number of ways (e.g., as a software fetch—decode—eval loop, a just-in-time compiler, or even a hardware CPU).

In one implementation, the instructions of the input instruction stream 160 are in the same instruction set as that of the machine on which the translator is running (native-to-native translation). In the native-to-native case, the primary advantage obtained by the translator flows from the dynamic optimization 150 that the translator can perform. In another implementation, the input instructions are in a different instruction set than the native instructions.

A trace selector 120 is provided that identifies instruction traces to be stored in the code cache 130. The trace selector is the component responsible for associating counters with interpreted program addresses, determining when a "hot trace" has been detected, and then growing that hot trace.

Much of the work of the dynamic translator occurs in an interpreter—trace selector loop. After the interpreter 110 interprets a block of instructions (i.e., until a branch), control is passed to the trace selector 120 so that it can select traces for special processing and placement in the cache. The interpreter—trace selector loop is executed until one of the following conditions is met: (a) a cache hit occurs, in which case control jumps into the code cache, or (b) a hot start-of-trace is reached.

When a hot start-of-trace is found, the trace selector 120 then begins to grow the hot trace. When the complete trace has been selected, then the trace selector invokes the trace optimizer 150. The trace optimizer is responsible for optimizing the trace instructions for better performance on the underlying processor. After optimization is done, the code generator 140 actually emits the trace code into the code cache 130 and returns to the trace selector 120 to resume the interpreter—trace selector loop.

To speed up emulation, caching emulators translate blocks of instructions and store them in a cache memory to avoid repeated emulation of the same code. The scheme presented in the present invention builds on top of previous block caching schemes and first level caching schemes by introducing a second level of translation in a transparent way, that is, without requiring changes in the first level translation. The present invention extends the idea of basic block caching through a hierarchical approach. The basic block translation of previous caching emulators provide the first level translation in the scheme of the present invention. Second level translations are then obtained by stringing together a sequence of first level translations based on collected execution histories. The translations resulting from the operation of the present scheme are much larger and extend beyond basic block boundaries. The present inventive scheme is completely transparent to the internals of the first level translation scheme and is not invasive of the first level translations. In this regard, first level translations remain unchanged and all profiling information regarding the first level translation is maintained in the emulator.

The emulator in accordance with the present invention now operates in one or two modes: a normal mode; and a history collection mode. In the normal mode of operation, first level translations are generated in a block caching emulator. To trigger a second level translation, execution counts are maintained in the emulator for selective first level translations. In previous block caching emulators used in the prior art, the exits and entries of translation in the cache are directly interconnected whenever possible to reduce unnecessary context switches between the cache and the emulator. Thus, once execution enters the cache the emulator does not regain control until execution exits the cache with a cache miss, i.e., via a branch that is not directly interconnected.

A problem arises as to how to insure that the emulator regains control to update the execution counts to be used to determine whether to trigger a secondary level translation. If all direct interconnections among first level translations are suppressed, second level execution counts can be easily maintained. However, disabling all interconnections among first level translations leads to an increase in context switches, thereby impacting performance adversely. To ensure that the emulator regains control prior to executing a particular translation, it is sufficient to disable direct interconnections from only that particular translation.

In accordance with the present invention, in order to keep the amount of execution counter storage to a minimum, counts are maintained for only a limited set of first level translations, referred to as translation heads. The following is one example of how to choose translations to be used as translation heads: choose as a translation head a first level translation that is the target of either (1) a backwards taken branch from another translation (determined based on the original code layout in the program being translated), or (2) a branch that exits from a second level translation. Other rules could be used to select translations to be used as translation heads: for example, beginnings of procedures could be chosen as translation heads; further, the rules could be used in various combinations.

It should be noted that a look-up table may be utilized to list whether a given translation is a second level translation or a first level translation. Accordingly, to ensure that the emulator regains control just prior to executing a translation head, any direct connection to a first level translation that originates (1) from a backwards taken branch of a different translation, or (2) from a second level translation, is disabled. All other branches may still be interconnected directly.

Each time the emulator regains control after an exit from the cache, the origin of the exiting branch is inspected. If the exiting branch targets a translation that already resides in the cache, then it is clear that the target translation must be a translation head and its execution counter is incremented.

Figure 2:
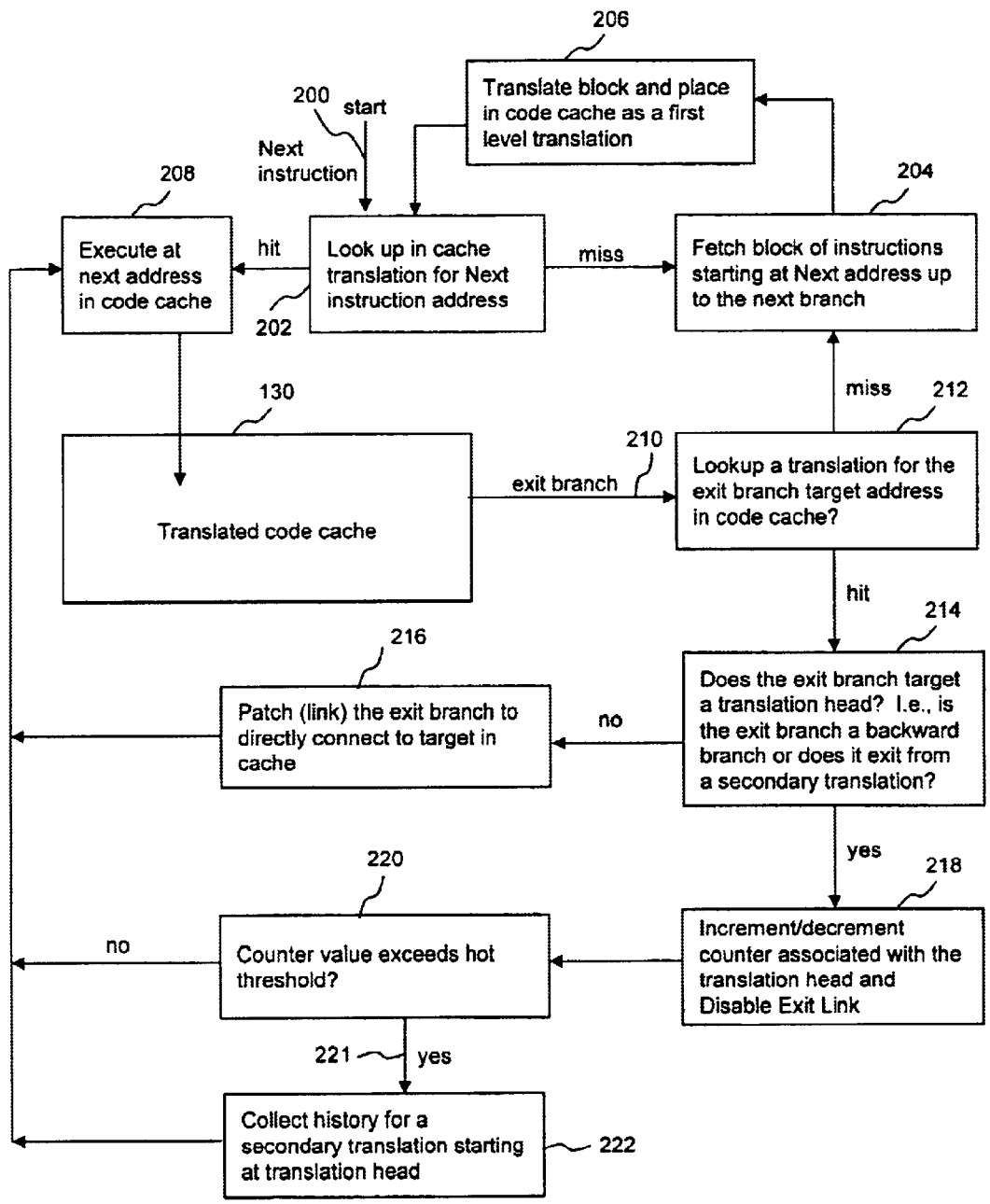
FIG. 2 is a flowchart illustrating the flow of operations in accordance with the present invention.

FIG. 2 provides an implementation of one embodiment of the normal mode. FIG. 2 comprises a logic flow for the trace selector 120 of FIG. 1. Note that the word "execution" in the present context means execution of the emulator program. Referring now to FIG. 2, an instruction is applied on line 200 to Block 202. In Block 202, the execution looks up in cache 130 to determine if there is a translation for this Next instruction address. If there is no translation for this instruction in the cache 130, then this is a miss and the execution moves to Block 204. Block 204 fetches a block of instructions starting at this next address up to the next branch. This block of instructions is then translated and placed in the code cache 130 (shown in FIG. 1) as a first level translation.

Alternatively, if the Next instruction is found in the cache 130, then the execution moves to Block 208 and executes at the address for the Next instruction in the code cache 130.

Upon the execution of an exit branch 210 from the code cache 130, the execution moves to Block 212. Block 212 determines whether a translation for the target address of the exit branch is present in the code cache 130. If the answer is NO (a miss), then the execution moves to Block 204 to fetch the block of instructions starting at this Next address up to the next branch. Note that in this case, the Next address is the target address for the exit branch.

Alternatively, if the translation for the target address of the exit branch is present in the code cache 130, so that there is a hit, then the execution moves to Block 214. In Block 214, it is determined whether the target of the exit branch is a translation head. In this regard, it is determined whether the exit branch is a backwards branch, based on the original code layout of the program being translation, or whether the exit branch is exiting from a secondary translation. A backward taken branch is a useful start-of-translation head condition because it exploits the observation that the target of a backward taken branch is very likely to be (though not necessarily) the start of a loop. Since most programs spend a significant amount of time in loops, loop headers are good candidates as possible hot spot entrances. Also, since there are usually far fewer loop headers in a program than taken branch targets, the number of counters and the time taken in updating the counters is reduced significantly when one focuses on the targets of backward taken branches (which are likely to be loop headers), rather than on all branch targets.

If both of these conditions in Block 214 are NO, then the execution moves to Block 216 to directly connect this exit branch to its target in the cache. The execution then moves to Block 208.

Alternatively, if it is determined that one of the conditions for a translation head determined in Block 214 is YES, then the execution moves to Block 218. In Block 218 it is determined whether a counter has been associated with this particular translation head, and if no counter has yet been associated with the translation head, then a counter is associated with the translation head. The counter associated with the translation head is then incremented or decremented. Additionally, any exit branch from the translation head is disabled. The original target of this exit branch which was disabled is then saved in a look-up table accessible by the emulator to allow it to be enabled again at a later point. The execution then moves to Block 220 to determine whether the counter value held in the counter associated with this translation head exceeds a hot threshold. If the answer is NO, then the execution moves to Block 208.

Alternatively, if the counter value of the counter associated with the translation head exceeds a hot threshold, then the execution moves to Block 222. Block 222 operates to collect history for a secondary translation starting at this hot translation head.

Figure 3:
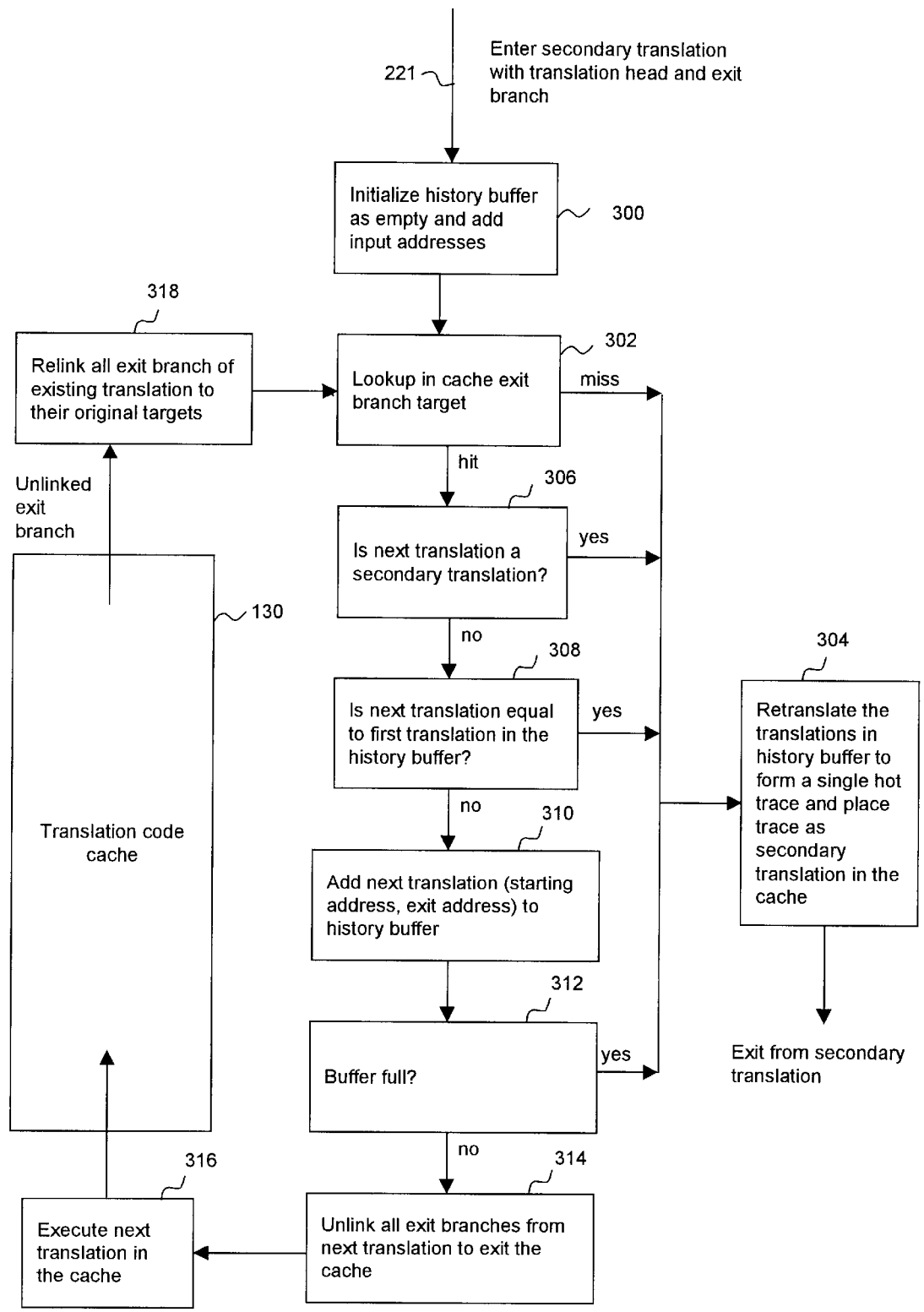
FIG. 3 is a flowchart illustrating the flow of operations in accordance with the present invention.

Referring now to FIG. 3, when the execution count value in the associated counter for the first level translation head exceeds a pre-set threshold, a second level translation collection mode is triggered in Block 222 in the emulator operation. Second level translations are based on the idea that if a particular translation head has been become hot, then the subsequently executing translations are also likely to be part of the hot region. The components of a second level translation are collected in a history buffer, which may, in one embodiment, be a fixed size buffer. A pointer to each executing translation is entered into the history buffer along with a pointer to the branch that exited from that translation. Such a history collection is only enabled temporarily when executing in the secondary level translation collection mode.

In order to insure that the emulator regains control prior to executing each subsequent component of subsequently executing translations, the outgoing link branches of the translation that is next to be executed are unlinked or disabled, i.e., the direct interconnection to another translation is undone. Rather, the translation is caused to branch to the emulator and the target of the outgoing branch for that particular translation is stored in a look-up table. When execution reaches the end of the translation whose exit branches have been disabled, it will trap to the emulator automatically since it is no longer connected to any translation in the cache 130.

In summary, the following emulator actions take place each time the emulator regains control during this history collection for the secondary level translation collection mode: (1) enter a pointer to the most recently executed translation and its exiting branch into a history buffer; (2) re-enable the interconnection of the most recently executed translation to its previous successors in the cache; (3) disable only interconnections to the successors of the next-to-execute translations; and (4) jump to the next translation.

Referring now to FIG. 3, an embodiment of the operation flow of the collect history Block 222 is shown. The execution moves to Block 300, wherein a history buffer is initialized as empty, and a pointer or address for the translation head and the exit branch target for the translation head are stored in the history buffer. The execution then moves to Block 302 to determine if the target of the exit branch from the translation head is in the cache 130. If there is a miss, then the execution moves to Block 304, which operates to re-translate the translations in the history buffer to form a single hot secondary level translation and to place that single hot secondary level translation into the cache 130. From Block 304, the execution exits from the secondary level translation collection mode. The exit from the secondary level translation goes to the trace optimizer 150 in FIG. 1.

Alternatively, if the translation for the target of the exit branch is present in the cache 130, then there is a hit, and the execution moves to Block 306. In Block 306, it is determined whether this next translation is a secondary level translation. If the answer is YES, then the execution moves to Block 304 and that block is executed. Alternatively, if the next translation is not a secondary translation, then the execution moves to Block 308.

In Block 308, it is determined whether the next translation is equal to the first translation in the history buffer. If the answer is YES, then the translation moves to Block 304 and Block 304 is executed. Alternatively, if the next translation is not equal to the first translation in the history buffer, then the execution moves to Block 310. In Block 310, the starting address and the exit branch address for this next translation are added to the history buffer.

The execution then moves to Block 312, wherein it is determined whether the history buffer is full. If the answer is YES, then the execution moves to Block 304 and Block 304 is executed. Alternatively, if the buffer is not full, then the execution moves to Block 314. Block 314 operates to unlink or disable all exit branches in this next translation that directly interconnect to another translation so that the exit branches exit the cache. In one embodiment, this disabling process comprises causing the exit branch to trap to the emulator automatically. The target of the exit branch is then stored in a look-up table for future use.

The execution of the program being executed then moves to Block 316 wherein this next translation in the cache is executed. After the execution of this Next translation in the cache 130, the execution moves to Block 318. In this regard, the execution has exited the cache because the exit branch has been unlinked so that the translation is trapped to the emulator. In Block 318, the execution relinks all exit branches of the just executed translation to their original targets. The original targets for these exit branches are obtained from the previously noted look-up table. The execution then moves to Block 302 to determine if there is a translation of the target of this exit branch of the translation just executed in the cache. The execution then cycles through this operation again until one of the termination conditions listed in Blocks 302, 306, 308 and 312 is met.

In a preferred embodiment, in order to efficiently link/enable or unlink/disable translations in the cache, the linking/enabling scheme described in a related co-filed patent application can be used. In this regard, see the application "Scheme for Fast Unlinking of a Linked Branch in a Caching Dynamic Translator", by V. Bala, E. Duesterwald, S. Banerjia, U.S. patent application Ser. No. 09/755,780, filed Jan. 5, 2001. It is of course understood, that a variety of other methods of linking and unlinking translations can be utilized including using one or more large look-up tables.

As noted above, it can be seen that the history collection in the secondary level collection mode terminates when one of three termination conditions have been met: (1) the next translation to be executed is identical to the first translation in the buffer (i.e., a cycle); (2) the history buffer is full; or (3) the next translation is a secondary level translation.

Although the present description up to this point assumes that basic clocks are the unit for the first level translation, the first level translations may also be larger code regions. For example, first level translations can be provided by statically predicted traces, as described in a co-filed patent application "Speculative Caching Scheme for Fast Emulations Through Statically Predicted Execution Traces", by E. Duesterwald, B. Bala, and S. Banerjia, U.S. patent application Ser. No. 09/756,019, filed Jan. 5, 2001.

Accordingly, it can be seen that when the history collection of the secondary level collection mode terminates, the history buffer contains a sequence of translations along with their exit branches. This sequence is used to build a new second level translation by stringing together the first level translations to obtain a single large secondary level translation sequence. The exit branches stored in the buffer along with each translation starting address accurately determine the portion of the translation that has executed, and that must therefore be included in the secondary translation. Then when this new secondary level translation is completed, it is entered into the cache and the look-up tables of the emulator are updated accordingly and execution continues in normal execution mode.

While previous caching emulators have been effective in speeding up emulation time, emulation remains very slow. The present invention improves the performance of a caching emulator by improving the quality of the translated code through an additional level of secondary translation. Since secondary level translations are longer and have a larger scope, new opportunities for code improvements are exposed that are not available to first level translation schemes. In this regard, relaying out branches in the translation cache provides the opportunity to improve the branching behavior of the executing program compared to a block based caching translator and even compared to the original binary. When considering only basic blocks, a block does not have a fall-through successor, and thus each block terminates with two branches and at least one of them will take. When considering sequences of basic blocks, each internal block has a fall-through successor and a branch is only taken when exiting the translation. Thus, the history based scheme of the present invention will lead to fewer branches being executed compared to a block based translation scheme. Moreover, the scheme of the present invention also reduces the amount of indirect branch execution, which provides an even more important performance advantage.

Another advantage of considering sequences of first level translation is that optimization opportunities are exposed that only arise across basic block boundaries or first level translation boundaries, and are thus not available to the basic block translator. Procedure call and return inlining is an example of such an optimization that is possible if both the call to and the return from a procedure are included in the execution history. Other optimization opportunities exposed to the trace translator of the present invention include classical compiler optimizations such as redundant mode removal. These trace optimizations provide a further performance boost to the emulator.

Importantly, the secondary level translation scheme of the present invention is implemented in a non-invasive manner leaving the mechanism of the first level translation, as well as the code produced by the first level translation, entirely unchanged. For efficiency, second level translations of the present invention do not rely on extensive profiling of first level executions. Rather, profiling is limited to a set of selective first level translations, i.e., the translation heads. The actual selection of the second level sequences for the second level translation proceeds with very low overhead by simply collecting the current execution history until an end-of-translation condition has been met.

The foregoing has described a specific embodiment of the invention. Additional variations will be apparent to those skilled in the art. For example, although the invention has been described in the context of a dynamic translator, it can also be used in other systems that employ interpretators or just-in-time compilers. Furthermore, the invention could be employed in other systems that emulates any nonnative system, such as a stimulator. Thus, the invention is not limited to the specific details and illustrative example shown and described in this specification. Rather, it is the object of the appended claims to cover all such variations and modifications as come within the true spirit and scope of the invention.

What is claimed is:

1. A method for growing a secondary trace out of a cache of translations for a program during the program's execution in a dynamic translator, comprising the steps of:
   (A) maintaining execution counts for translation heads that are executed from a code cache;
   (B) when an execution count for one of said translation heads exceeds a threshold, designated as a hot translation head, beginning a mode of operation in which, as following code translations are executed from the code cache after the execution of the hot translation head, storing in a history buffer information identifying each of said following code translations in sequence;
   (C) terminating the storing of information in the history buffer in relation to the hot translation head when a termination condition is met; and
   (D) linking together the translation head and the sequence of following code translations identified in the history buffer to form a larger code translation.

2. The method of claim 1, in which translation heads are identified as either a target of a backwards taken branch from another code translation or a target of a branch that exits from a second-level translation.

3. The method of claim 1, further comprising the step of identifying code translations that are translation heads and disabling certain branches that connect the translation head to successor translations.

4. The method of claim 3, in which the branches that are disabled are certain direct connections to translation heads that are not second level code translations, and where the certain direct branches are those that originate from either a backwards taken branch of a different code translation or from a second-level code translation.

5. The method of claim 1, in which the information stored in the history buffer about a code translation is a pointer to the code translation and a pointer to the branch that exited from that code translation.

6. The method of claim 1, further comprising the step of, when in the mode of operation in which information is stored in the history buffer, prior to execution of each following code translation after the translation head, disabling the outgoing branches from the following code translation to successor code translations in the code cache, thereby assuring that the mechanism for storing information in the history buffer regains control prior to executing each subsequent code translation.

7. The method of claim 6, wherein the mode of operation in which information is stored in the history buffer includes the steps of (1) storing a pointer to the most recently executed following code translation and a pointer to its exiting branch, (2) re-enabling the disabled branch from the most recently executed following code translation to its successor code translation in the cache, (3) disabling the branch to the next-to-execute following code translation, and (4) jumping to the next-to-execute following code translation.

8. The method of claim 1, wherein the termination condition is met when either (1) the next following code translation to be executed is identical to the first code translation identified in the history buffer, or (2) the history buffer is full, or (3) the next following code translation is a secondary code translation.

9. A dynamic translator for growing a secondary trace out of cache translations for a program during the program's execution in a dynamic translator, comprising:
   (A) first logic maintaining execution counts for translation heads that are executed from a code cache;
   (B) second logic for, when an execution count for one of said translation heads exceeds a threshold, designated as a hot translation head, beginning a mode of operation in which, as following code translations are executed from the code cache after the execution of the hot translation head, storing in a history buffer information identifying each of said following code translations in sequence;
   (C) third logic for terminating the storing of information in the history buffer in relation to the hot translation head when a termination condition is met; and
   (D) fourth logic for linking together the translation head and the sequence of following code translations identified in the history buffer to form a larger code translation.

10. A computer program product, comprising: a computer usable medium having computer readable program code embodied therein for growing a secondary trace out of cache translations for a program during the program's execution in a dynamic translator comprising:
   (A) first code maintaining execution counts for translation heads that are executed from a code cache;
   (B) second code for, when an execution count for one of said translation heads exceeds a threshold, designated as a hot translation head, beginning a mode of operation in which, as following code translations are executed from the code cache following the execution of the hot translation head, storing in a history buffer information identifying each of said following code translations in sequence;
   (C) third code for terminating the storing of information in the history buffer in relation to the hot translation head when a termination condition is met; and
   (D) fourth code for linking together the translation head and the sequence of following code translations identified in the history buffer to form a larger code translation.

* * * * *